United States Patent
Hawes

(10) Patent No.: US 8,210,586 B2
(45) Date of Patent: Jul. 3, 2012

(54) PICK AND PLACE HANDLING DEVICE

(75) Inventor: Richard John Hawes, Hethersett (GB)

(73) Assignee: AEW Delford Systems Limited, Norwich (GB)

( * ) Notice: Subject to any disclaimer, the term of this patent is extended or adjusted under 35 U.S.C. 154(b) by 844 days.

(21) Appl. No.: 12/096,665

(22) PCT Filed: Feb. 12, 2007

(86) PCT No.: PCT/GB2007/000485
§ 371 (c)(1), (2), (4) Date: Oct. 13, 2008

(87) PCT Pub. No.: WO2007/093774
PCT Pub. Date: Aug. 23, 2007

(65) Prior Publication Data
US 2009/0317221 A1    Dec. 24, 2009

(30) Foreign Application Priority Data

Feb. 15, 2006 (GB) .................................. 0603002.7
Mar. 6, 2006 (GB) .................................. 0604380.6
Nov. 27, 2006 (GB) .................................. 0623573.3

(51) Int. Cl.
*B66C 1/42* (2006.01)
(52) U.S. Cl. .................................. 294/86.4; 294/119.1
(58) Field of Classification Search ................ 294/86.4, 294/119.1, 2, 103.1, 116, 67.33, 81.54, 902
See application file for complete search history.

(56) References Cited

U.S. PATENT DOCUMENTS

| 2,615,748 | A | * | 10/1952 | Olson | ......................... | 294/67.33 |
| 4,621,852 | A | * | 11/1986 | Maki | ............................ | 294/86.4 |
| 4,746,255 | A | | 5/1988 | Roccabianca et al. | | |
| 5,088,783 | A | * | 2/1992 | Squires | ...................... | 294/81.54 |

FOREIGN PATENT DOCUMENTS

| DE | 3024133 A1 | | 1/1982 |
| DE | 3802620 A1 | * | 8/1989 |
| DE | 3802620 A1 | | 8/1989 |
| EP | 0063400 A1 | | 10/1982 |

(Continued)

OTHER PUBLICATIONS

In EP 1986941, observations in reply to the opposition, Apr. 19, 2011.

(Continued)

*Primary Examiner* — Saul Rodriguez
*Assistant Examiner* — Gabriela Puig
(74) *Attorney, Agent, or Firm* — Barnes & Thornburg LLP

(57) ABSTRACT

A pick and place device for picking up and re-positioning an article (11) carried by a support surface, comprising a first part which includes a plate portion (8, 8') which is movable parallel to the support surface so that a leading edge thereof penetrates below the article, between the article and the support surface, and a belt of flexible material (9, 9') which is wrapped around at least the leading edge of the plate portion so that it is sandwiched between the plate and the article when the former penetrates therebelow and as the plate portion moves below the article there is substantially no relative sliding movement between the sandwiched portion of the belt and the article.

25 Claims, 24 Drawing Sheets

FOREIGN PATENT DOCUMENTS

| | | |
|---|---|---|
| GB | 2317157 A | 3/1998 |
| GB | 2378432 A | 2/2003 |
| JP | 08132379 A | 5/1996 |
| JP | 2005001011 A | 1/2005 |
| WO | WO-99/00306 A2 | 1/1999 |
| WO | WO-03/011536 A1 | 2/2003 |
| WO | WO-03/011538 A1 | 2/2003 |
| WO | WO-2005/051812 A1 | 6/2005 |

OTHER PUBLICATIONS

In EP 1986941, reply of Oct. 21, 2011.
In EP 1986941, further submission of Nov. 8, 2011.
In EP 1986941, further submission of Dec. 2, 2011.
In EP 1986941, opposition decision of Dec. 29, 2011.
Search report from PCT/GB2007/000485, Oct. 21, 2011.
Search report from GB0623573.3, Mar. 15, 2007.

* cited by examiner

PICK AND PLACE HANDLING DEVICE

FIELD OF INVENTION

The invention concerns devices by which articles can be picked up and placed in a different position.

BACKGROUND TO THE INVENTION

Pick and place devices are of importance in automated product handling lines since when combined with sensors such as weighing cells, photocells, cameras and the like, articles on a conveyor belt can for example be identified according to size, colour, shape etc. and picked up and placed for example on an another conveyor, or into preformed packaging.

WO 2003/011536 A1 describes a gripping apparatus for pick and place handling of articles. The described device includes a pair of fingers between which articles are sandwiched, around which flexible belts pass which are movable relative to the fingers so as to lift or slide an article therebetween when moved in one sense, and downwardly or outwardly to deposit the article when the belts are moved in the opposite sense.

While such a pick and place device can be used to pick and place articles which can be lightly squeezed to allow the belts to engage and move them, it is of little value if the articles cannot be squeezed or cannot be picked up by such a device, such as in the case of thin slices of meat or thin slices of fish.

OBJECT OF THE INVENTION

It is an object of the present invention to provide a pick and place device which can be used to pick and place articles which cannot be squeezed as well as articles which can be squeezed so as to have universal application.

SUMMARY OF INVENTION

In a first aspect, the invention provides a pick and place device for picking up and repositioning an article carried by a support surface, comprising:
1) a first part which includes a thin plate portion which is movable parallel to the support surface so that a leading edge thereof penetrates below the article, between the article and the support surface, and
2) a belt of flexible material which is wrapped around at least the leading edge of the plate portion so that it is sandwiched between the plate and the article when the former penetrates therebelow and as the plate portion moves below the article, there is substantially no relative sliding movement between the sandwiched portion of the belt and the article.

In a second aspect, the invention provides a method of picking up and re-positioning an article carried by a support surface by use of a device comprising a first part which includes a plate portion and comprising a belt of flexible material which is wrapped around at least the leading edge of the plate portion, wherein the plate portion is moved parallel to the support surface so that a leading edge thereof penetrates below the article, between the article and support surface, and as the plate portion moves below the article there is substantially no relative sliding movement between the sandwiched portion of the belt and the article.

Optionally, the device comprises a second part which in use is situated to one side of the support surface, and defines a gap between its underside and the support surface or a plane containing the support surface. In use, the thin plate portion passes through the gap as it moves parallel to the support surface.

Preferably the belt is in tension around the plate and remains so irrespective of the position of the plate relative to the article, so that as the plate is withdrawn from below the article, there is again no relative sliding movement between the belt and the article, only between the belt and the plate.

Preferably means is provided for tensioning the belt.

In one embodiment an additional means is positioned on the other side of the support, by a distance from the first part which is at least sufficient to allow articles to pass therebetween, and the plate is moved towards the additional means when an article which is to be lifted up from the support surface is located between the plate and the additional means.

The additional means may simply comprise a stop against which an article will be pushed due to friction forces between it and the plate as the latter penetrates therebelow, to prevent any such penetration pushing the article sideways across the support surface.

Alternatively the additional means may comprise a second first part also having a flexible belt wrapped around the plate portion thereof, and the second first part is positioned relative to the first part so that the two plates move in the same plane but always in opposite directions, towards each other to penetrate below an article, and away from each other to disengage therefrom.

In one embodiment the plate portion constitutes a thin flat plate. In another embodiment the plate portion constitutes a thin curved plate so that further upwards motion is applied to the article as the plate portion moves parallel to the support surface.

Preferably, a part of the belt is secured at a point separate from the plate portion. In preferred embodiments, a part of the belt is secured to a point on the device and the plate portion and said point are moveable relative to each other.

The or each belt may be stretched around its plate with both of its ends secured to fixed points so that as the plate is moved relative thereto through the gap, the belt is also drawn therethrough sliding around the plate which remains encircled by the belt wherever it moves.

The two fixed points may for example coincide to comprise a single fixed point or be two points on a single member which is stationary relative to the plate.

Alternatively the belt may be endless and one part of the belt is secured to a fixed point to achieve the same effect.

The fixed point (or points) may for example be on the first part, close to the lower edge thereof.

In a further embodiment one end of the or each belt is secured to one end of a resiliently extensible device such as a helical spring. The other end of the or each belt is secured to a first fixed point. The other end of the resiliently extensible device is secured to a second fixed point, so that as the plate around which the belt passes is moved forwards to penetrate below an article, the device extends to permit the belt to follow the plate and as the latter moves rearwardly to disengage from an article, the resilience of the device keeps the belt tightly wrapped around the plate whilst shrinking to accommodate the reversing movement which would otherwise cause the belt to become slack.

In such an arrangement the first fixed point may be on the second part and the second fixed point may be on the first part of which the plate forms a part, so that it moves in the same way as does the plate, thereby reducing the extent by which the resilient device would otherwise have to extend to accommodate the movement of the belt around the plate as the latter moves forward.

The support surface may comprise the upper surface of a conveyor or other mechanical handling device which extends in front of the said first part of the device, or between the first pair of parts and the said additional means if the latter is present.

In a further embodiment two first parts are provided one on each side of an article support surface the two parts being movable as a unit up and down relative to the surface so that it extends below the plate portions of the two first parts and protrudes from below the leading edge of each plate to extend from one plate to the other, and in use the device is lowered over an article on the support surface so that the belt overlies and partially enwraps the article and thereafter the plates are moved towards one another so as to more completely enwrap the article as the plates penetrate therebelow.

When the article is to be released a reverse movement of the plates unwraps the belt from below an article so that after the plates have been retracted the belt will once again merely overlie and partially enwrap the article, so that the latter is free to be released therefrom either by dropping under gravity or by being moved transversely from between the two pairs of parts as by a conveyor or other mechanical handling device, or by simply lifting the two pairs of parts upwardly relative to a support surface on which the article has been placed to leave the article thereon.

The invention will now be described by way of example with reference the accompanying drawings in which:

FIGS. 1-3 is a series of side views of a mirrored gripper assembly having two moveable parts and two fixed parts, FIGS. 4-7 is a similar series of side views of a similar mirrored gripper assembly in which all the parts are movable, FIG. 8 illustrates how a central stop or restraining device can be incorporated, FIGS. 9-11 is a series of side views of a mirrored gripper assembly in which the belts are wrapped wholly around plates which are moved by the movable parts, and the other parts are fixed, FIGS. 12-15 is a similar series of side views of a similar mirrored gripper assembly containing belt-wrapped plates as in FIGS. 9-11 in which all the parts are movable, FIGS. 16-18 are side views of a single gripper device containing one movable part and one fixed part, FIGS. 19-22 are side views of another single gripper device in which both parts are movable, FIGS. 23-25 are side views of another single gripper device in which the belt is wholly wrapped around a plate, which is moved by the movable member, FIGS. 26-29 are side views of a single gripper device similar to that shown in FIGS. 23-25 but in which both parts are movable, FIGS. 30-43 illustrate a multiple gripper assembly incorporating four single gripper devices of the type shown in FIGS. 16-22, to allow up to four articles to be picked and placed simultaneously, FIGS. 44-46 illustrate a mirrored gripper assembly in which one of each pair of parts is fixed and the other is movable and a belt is secured to and extends between the two movable parts to bridge the gap therebewteen with slack, so that when the device is positioned above an article to be picked and placed and lowered relative thereto, the belt envelopes the article as the plate portions of the movable members slide therebelow, FIGS. 47-50 are similar views to FIGS. 44-46 of a similar device in which all four parts are movable, and FIGS. 51-55 illustrate a mirrored gripper which operates on a similar principle to that shown in FIGS. 44-46 but having only two parts, each of which is movable.

IN THE DRAWINGS

FIGS. 1-8 show side views of a gripper assembly which is carried at the end of a robotic arm (not shown), and which is symmetrical about the centreline 1.

On one side a fixture comprising a block 2 and arm 3 extends from a transverse support rod 4 itself carried by a fixture 5 which will normally be attached to the robotic arm. To the rear of the fixture 2, 3 is a sliding fixture comprising a block 6 slidable along rod 4, an arm 7 and a foot in the form of a flat plate 8.

A flexible belt 9 is anchored at one end to the arm 3 and is joined at its other end to one end of a spring 10 the other end of which is anchored to block 6, and which acts to maintain tension in the belt.

The belt extends around the leading end (or nose) and below the underside of, the plate 8.

The assembly is symmetrical about the centre line 1 and the parts making up the other half of the mirrored assembly are denoted by the same reference numerals, but with a suffix.

Thus on this other side of the device the plate is 8', the spring is 10', the other fixture is 2', 3' and the sliding block is 6'.

The sliding blocks 6 and 6' are linked by a mechanism (not shown) which ensures they both move through the same distance, albeit in opposite directions, when driven by an actuator.

The mechanism may comprise or include the actuator which may for example comprise a pneumatic cylinder.

An article 11 to be picked by the gripper, is carried to the pick zone by a conveyor belt 12.

The belt has raised ribs 13, 14 on which the article sits, to assist the plates 8, 8' in getting underneath the article with a minimum of disruption. Since the plates 8, 8' are relatively thin and can slide below an article, they will be referred to hereinafter as blades rather than plates.

When the gripper is correctly positioned relative to an article, (or vice versa), the blocks 6, 6' are driven towards each other into a closed position. As the blades 8, 8' move under the article they drag the belts around the leading edge of each blade and as a result the springs 10, 10' are stretched. At the nose of each blade, the movement of the belt is in an upward sense relative to the article, which therefore tends to lift the latter off the belt and thus assist the blades to get underneath the article.

Although each belt makes contact with the underside of the article there is no relative sliding movement between the belt and the article, and therefore no force due to friction acting to move the article as the blades 8, 8' advance therebelow.

Similarly when the blades retract to place the article in its desired location, the belts (9, 9') peel away from the underside of the article without any relative sliding movement parallel to the underside of the article, and again there is therefore no frictional force to drag the article laterally during the release phase of a pick and place operation. More particularly:—

Figure 1:
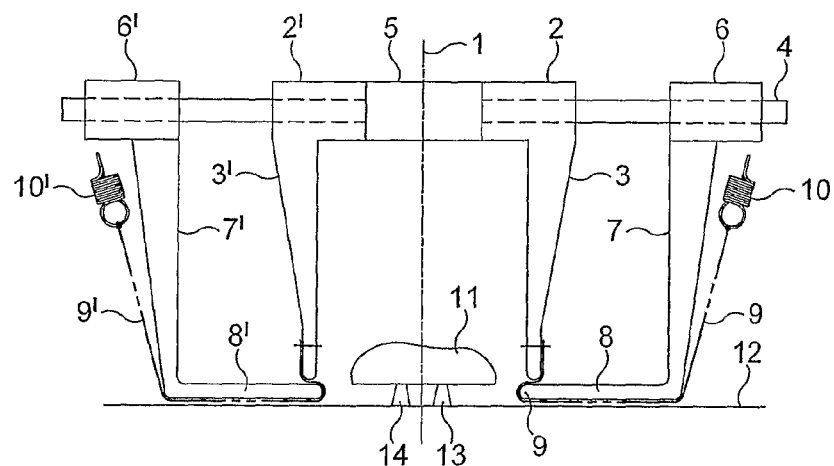
FIG. 1 shows the arrangement with the blades 8, 8' about to be moved to their closed position.
Figure 2:
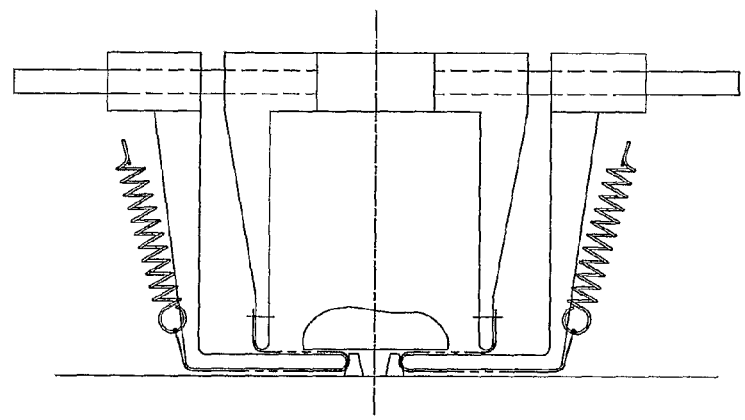
FIG. 2 shows the blades in their closed position.
Figure 3:
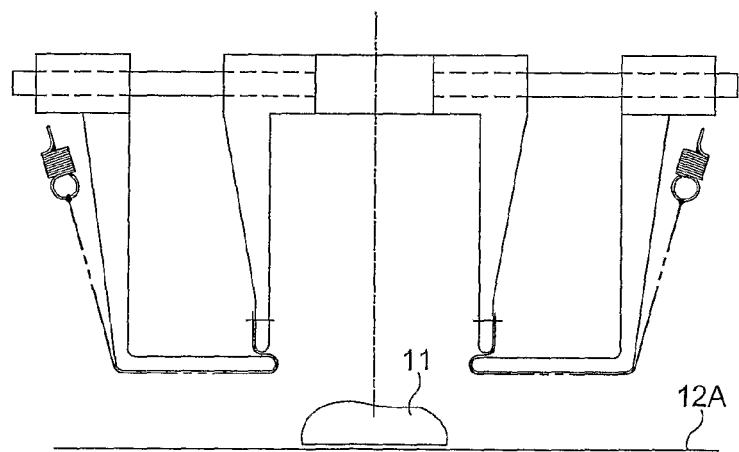
FIG. 3 shows the blades back in their open position with the article 11 released onto another conveyor 12A.
Figure 4:
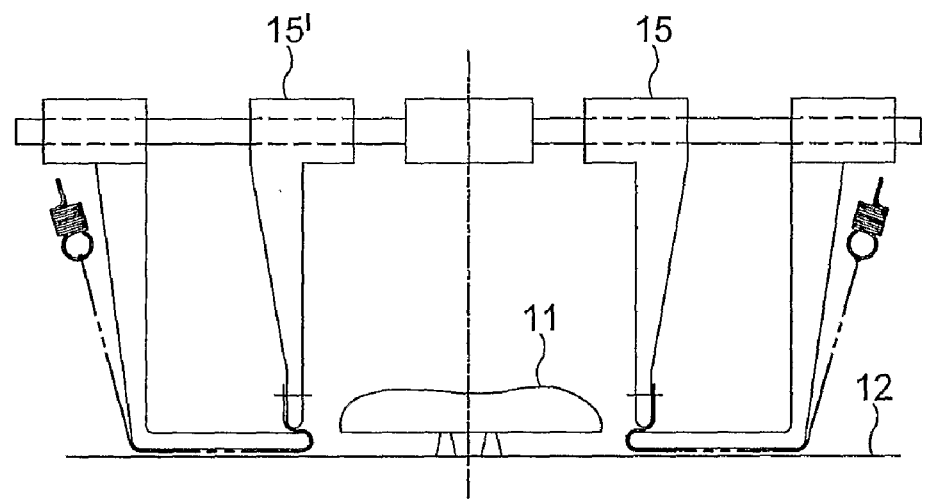
FIGS. 4-7 show a similar mirrored gripper assembly but in this case the fixed blocks 2, 2' are replaced by movable blocks 15, 15'.
Figure 5:
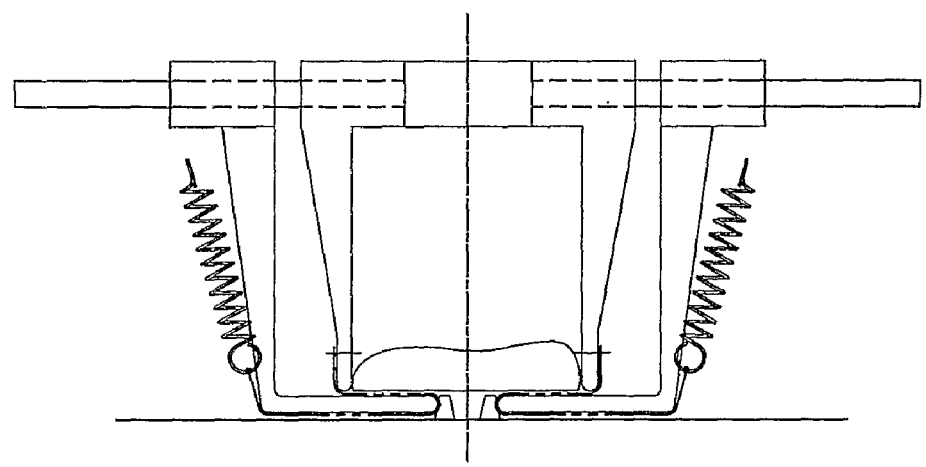
Figure 6:
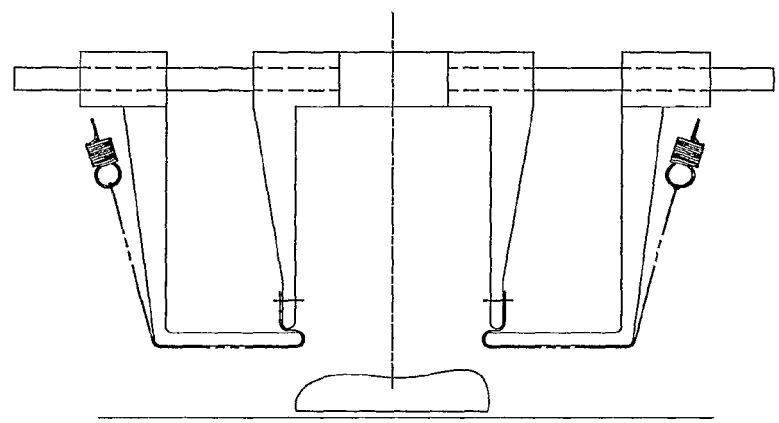
Figure 7:
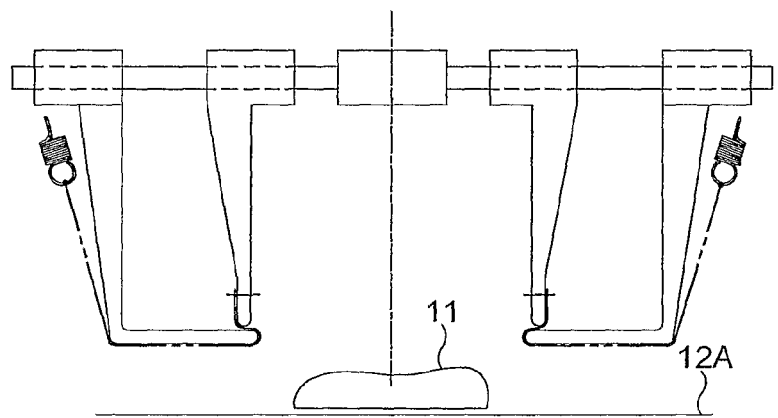

A separate mechanism (not shown) is provided which when actuated operates to drive the movable blocks (15, 15') through the same distance albeit always in opposite directions.

The blocks 15, 15' move independently of the blocks 6,6' but can be closed or opened simultaneously with the blocks 6, 6' and therefore the blades 8, 8' also.

Each mechanism may comprise or include a pneumatic cylinder.

In a preferred mode of operation the blades 8, 8' and movable fixtures 15, 3 and 15, 3' are moved simultaneously towards each other, and the latter are left in that closed position while the blocks 6, 6' and blades 8, 8' are moved back to their open position, to allow the article to be placed. This mode of operation enables an article that is oversize to be squeezed and for the reduced size to be retained during the placing operation. The movable fixtures (15, 3; 15', 3') are then separated after or during placement, but in any case prior to the next pick operation, to release the article onto another conveyor 12A.

Figure 8:
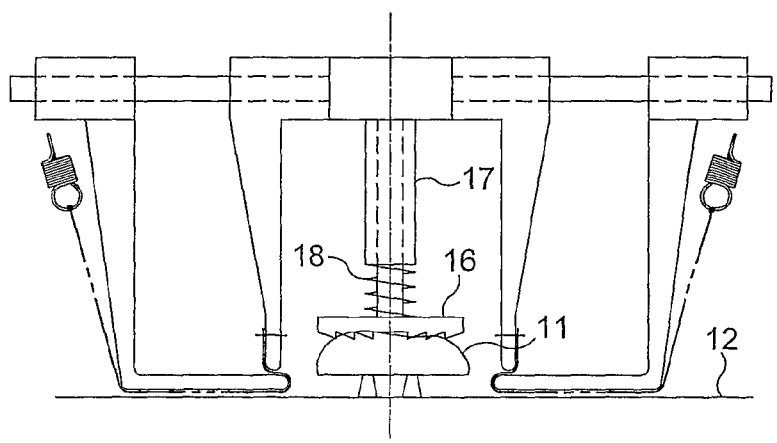

FIG. 8 shows a restraining pad 16 between the two blades 8, 8'. The pad exerts pressure on top of an article 11 prior to picking, to help ensure stability and minimise article movement while being picked and placed. The pad is mounted at the lower end of a shaft 17 by which it can be moved vertically but not laterally. It is also restrained from rotating. The shaft 17 includes a step between regions of smaller and larger cross section, and a spring 18 acts between the step and the pad 16 to bias it downwards.

Restraining pad assemblies such as shown in FIG. 8 can also be fitted in other gripper arrangements such as are illustrated in later Figures up to and including FIG. 43.

The assemblies shown in FIGS. 9 to 15 are similar to those in FIGS. 1 to 7 but differ in the way the belt is wrapped and restrained. Here each belt 9 is wrapped completely around blade 8, 8' and both ends are fixed to a single point 19, 19' on its respective fixture arm 3, 3'. The action of the belts on movement of the blades is the same as previously described.

The sliding blocks 6, 6' can be connected to the blades 8, 8' outside of the belts 9, 9', or each belt can be split into two separate spaced apart parts to allow the connection to be made centrally, between the two belt runs.

Figure 9:
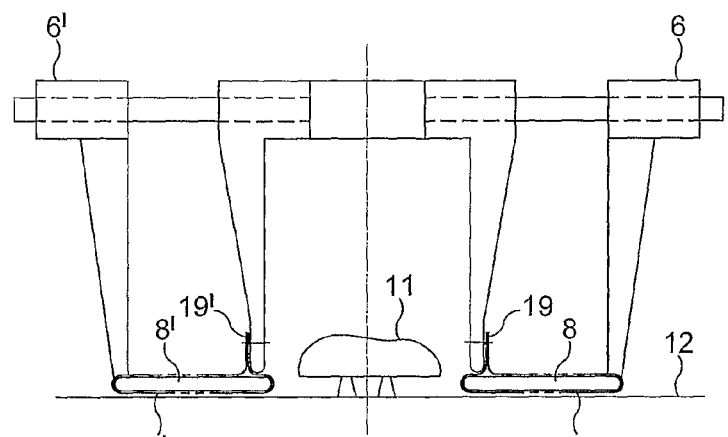
Figure 10:
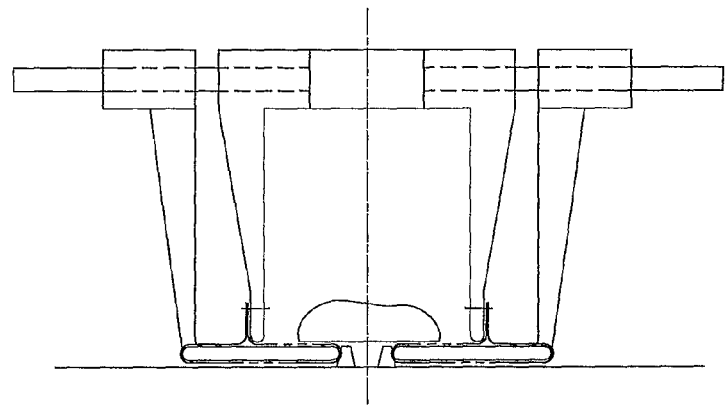
Figure 11:
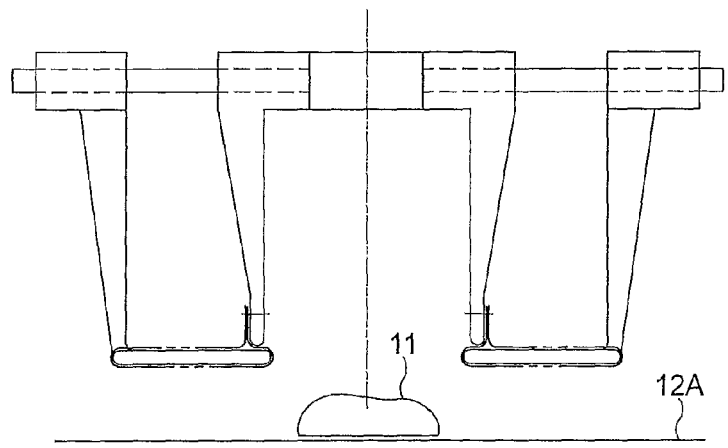
Figure 12:
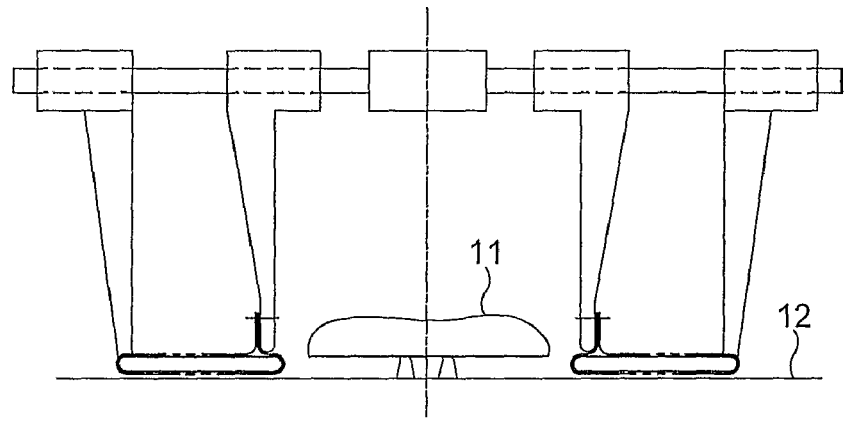
Figure 13:
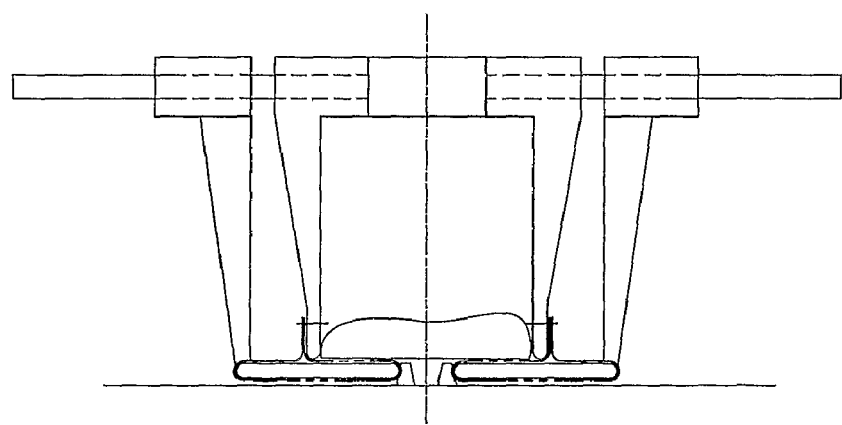
Figure 14:
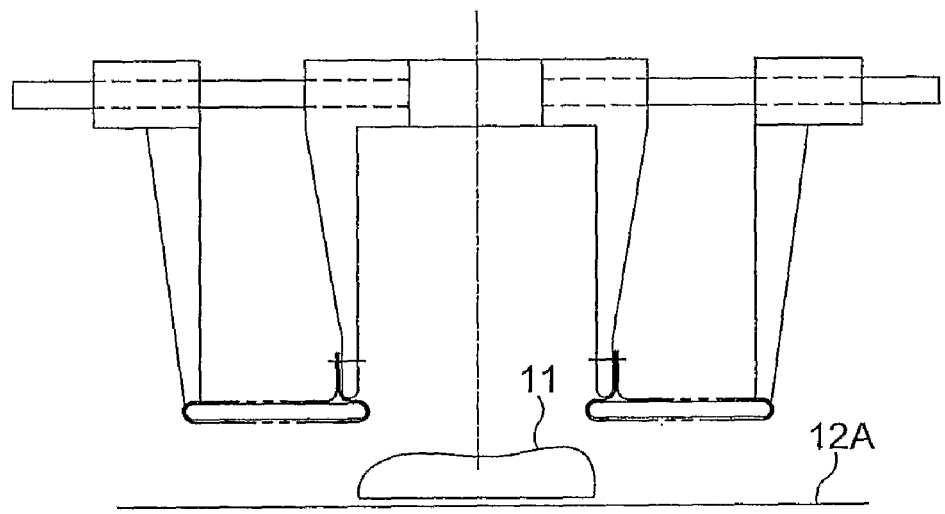
Figure 15:
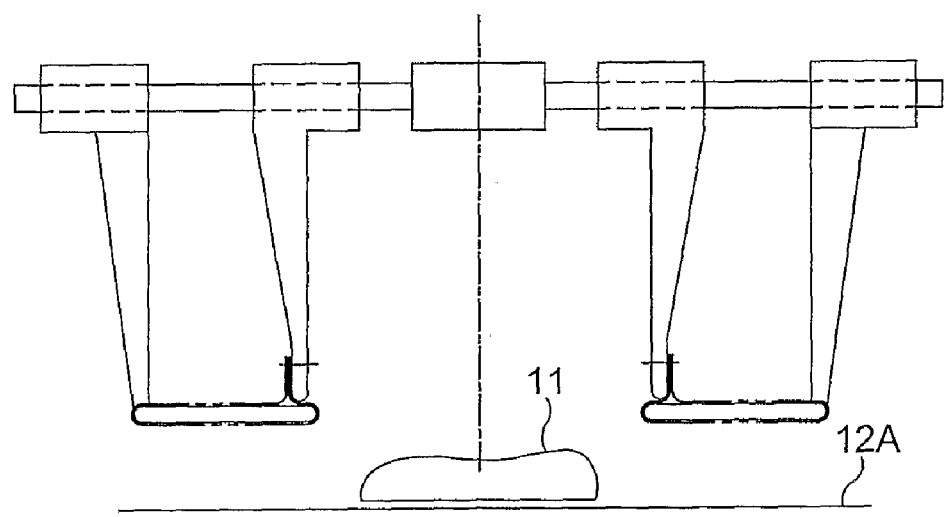

In FIGS. 9-11 the blocks 2, 2' do not move.

In FIGS. 12-15, movable blocks 15, 15' are provided which serve the same purpose and perform in the same way as do the movable blocks 15, 15' described in relation to FIGS. 4 to 7.

The restraining pad assembly of FIG. 8 can also be fitted to the devices of FIGS. 9-15.

An alternative arrangement is shown in FIGS. 16-22.

Here there is a single blade 20 carried by a single arm 21 depending from a sliding block 22 and the second fixture and second blade of the earlier Figures are replaced by a fixed barrier 23 to act as a lateral restraint on an article. A leading fixture comprising arm 24 and block 25 can be stationary or slidable along the rod 26, which latter extends from a fixed block 27 carried at the upper end of the barrier 23. The article is again denoted by 11 and is carried on a conveyor belt 12 as previously described. Likewise a spring 28 tensions the belt 29 between an anchorage point 30 on the arm 24, and an anchorage point 31 on the slidable block 22.

Figure 16:
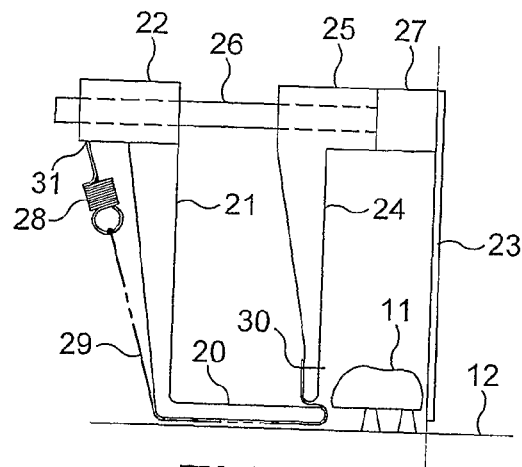
Figure 17:
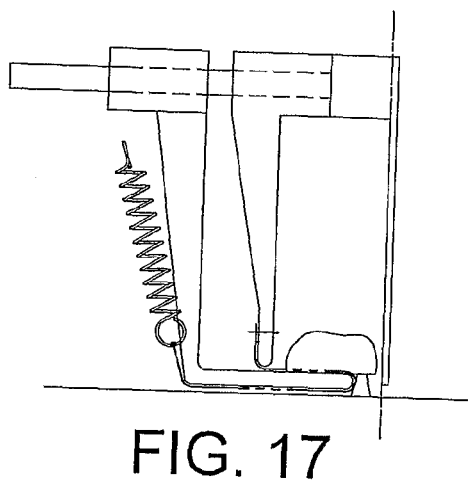
Figure 18:
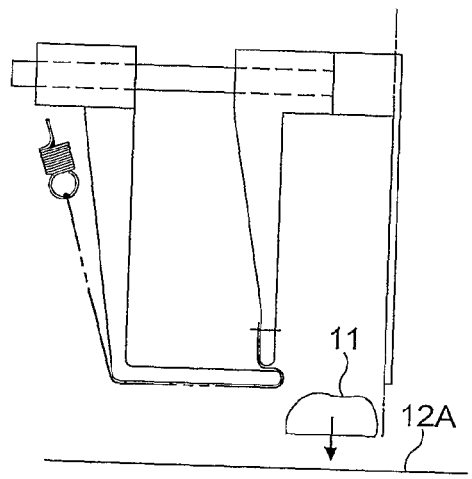
Figure 19:
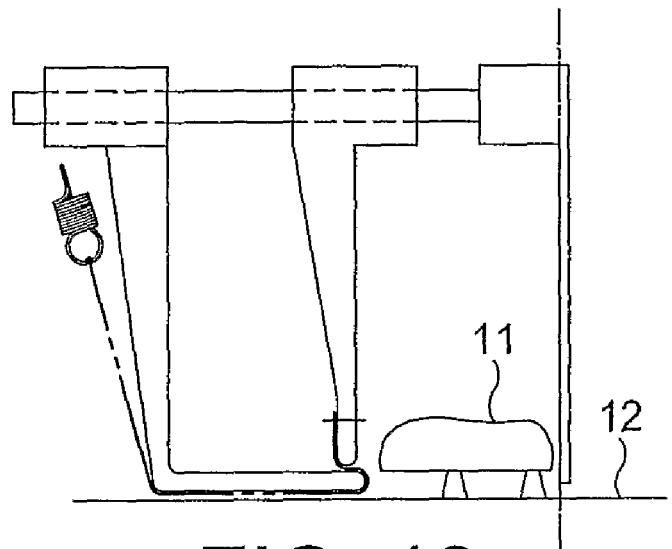
Figure 20:
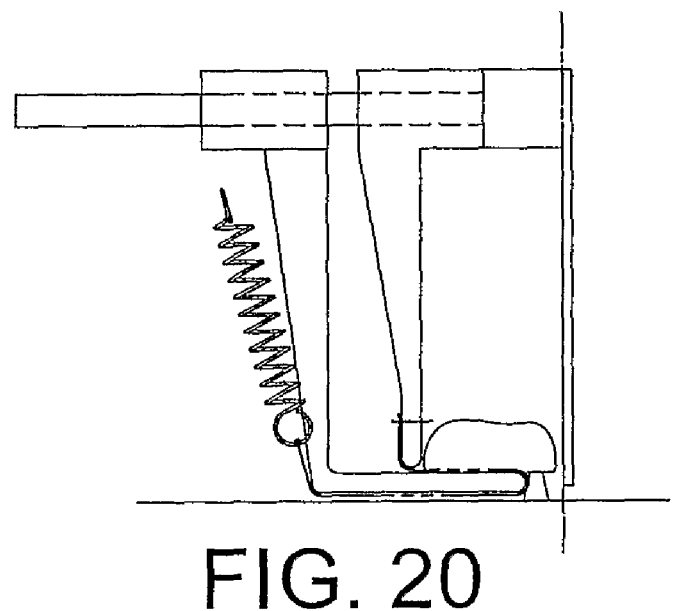
Figure 21:
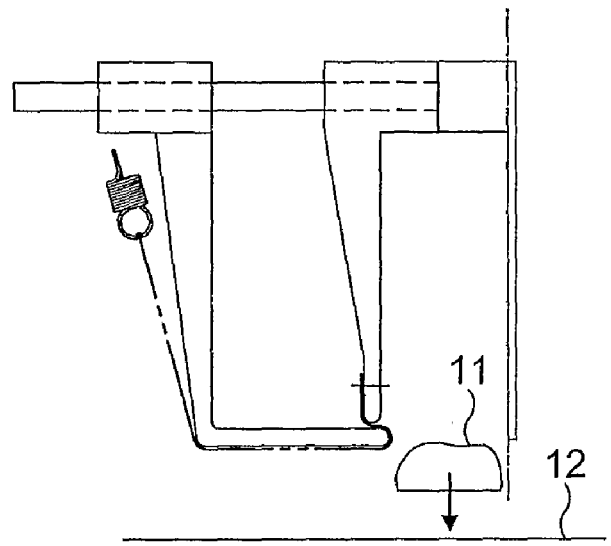
Figure 22:
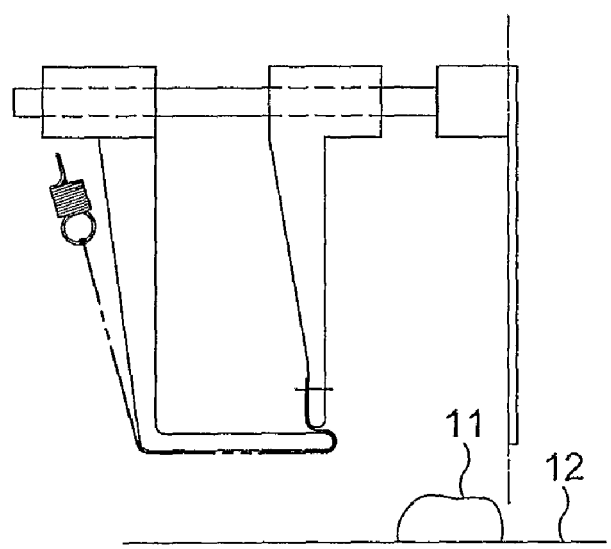

The block 25 is assumed to be fixed in position on the rod 26 in FIGS. 16-18, but is slidable therealong in FIGS. 19-22. In each case the article is lifted from a conveyor 12 and deposited onto another conveyor 12A.

The restraining pad of FIG. 8 can also be fitted to the arrangements of FIGS. 16-22.

Figure 23:
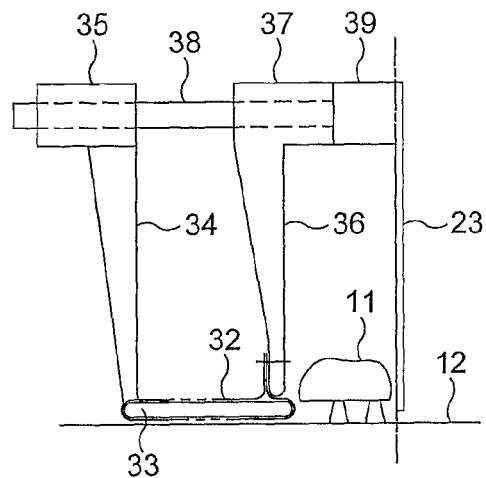
Figure 24:
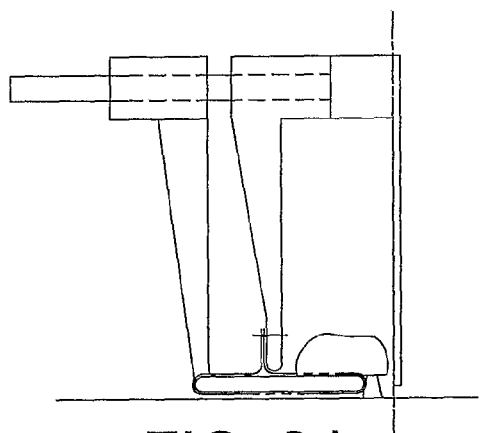
Figure 25:
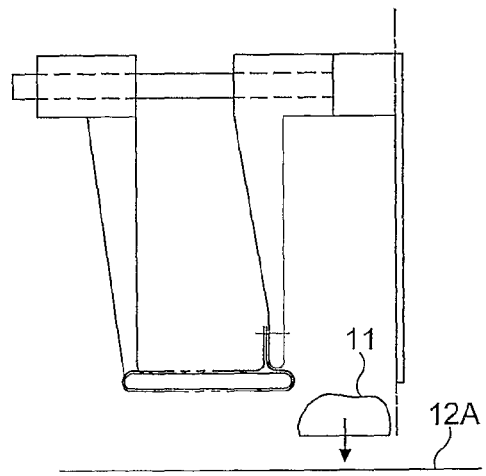
Figure 26:
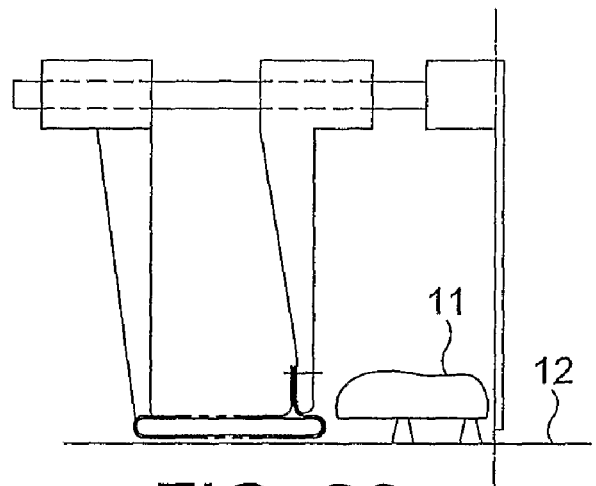
Figure 27:
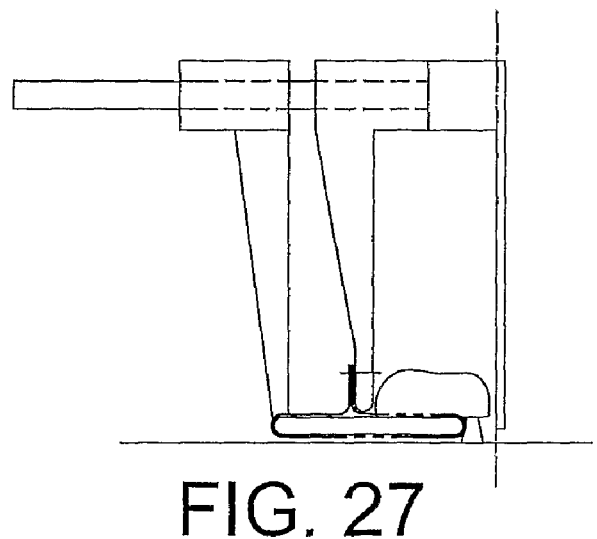
Figure 28:
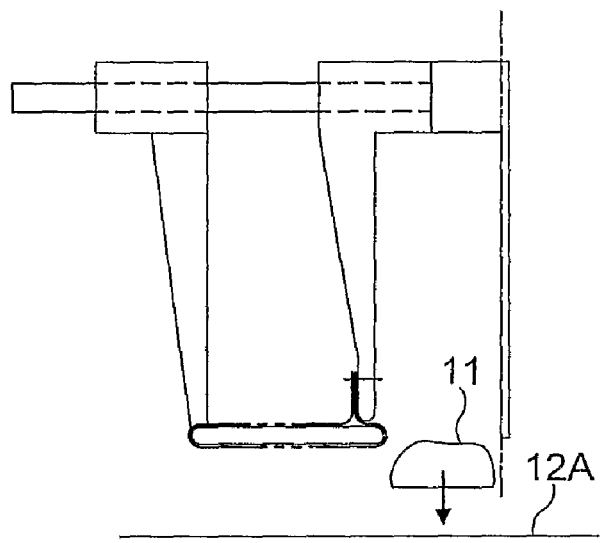
Figure 29:
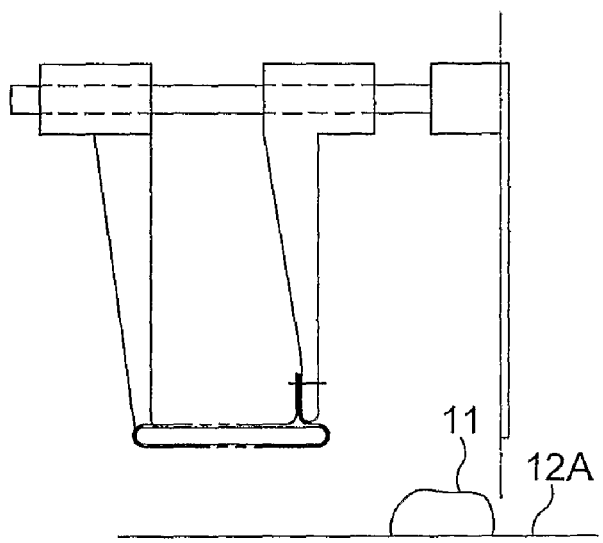

FIGS. 23-29 show a single belt 32 wrapped around a single blade 33 at the lower end of an arm 34 depending from a slidable block 35 operating as described with reference to FIGS. 9-15, combined with a fixed barrier 23 which acts as a lateral restraint on the article 11. The fixture comprising arm 36 attached to block 37 can be fixed in position on the rod 38 as shown in FIGS. 23-25 or movable therealong as shown in FIGS. 26-29. The rod 38 extends from a block 39 which is carried by the upper end of the fixed barrier 23.

In each case the article is lifted from conveyor 12 and deposited on conveyor 12A.

A restraining pad assembly of FIG. 8 can also be fitted to the arrangements of FIGS. 23-29. FIGS. 30-43 show a multiple version of the gripper assemblies of FIGS. 16-22 or FIGS. 23-29.

Any number can be mounted on the end of a robotic arm, but patterns of two or four are typical combinations, given the spacing between adjacent products along the infeed conveyor.

The robotic arm includes the appropriate geometry and is programmed so that when picking product from the infeed conveyor, an appropriate offset/rotation is performed.

The advantage is speed. It is clearly quicker to pick say four pieces one after the other and then place all four in one operation in a container, than to pick and place each one at a time.

Also the spacing of the individual grippers can be arranged so that the position of the four products matches the positions they are to adopt in a thermoformed packaging, so that the group of four products can be placed therein simultaneously.

Figure 30:
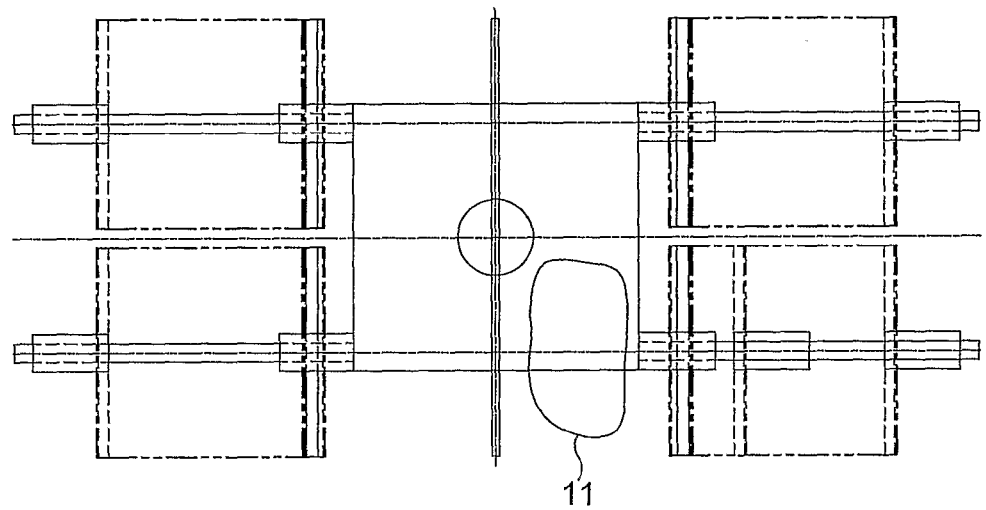
Figure 31:
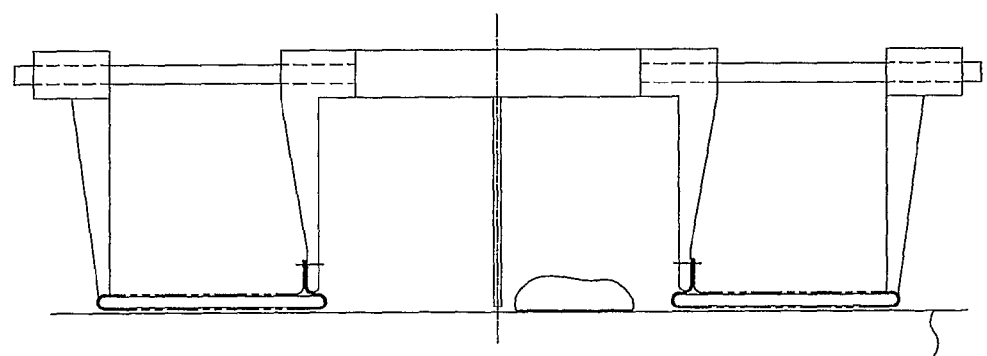

FIGS. 30 and 31 are plan and side views of the four station gripper assembly with one product piece about to be picked (bottom right) from a conveyor 12.

Figure 32:
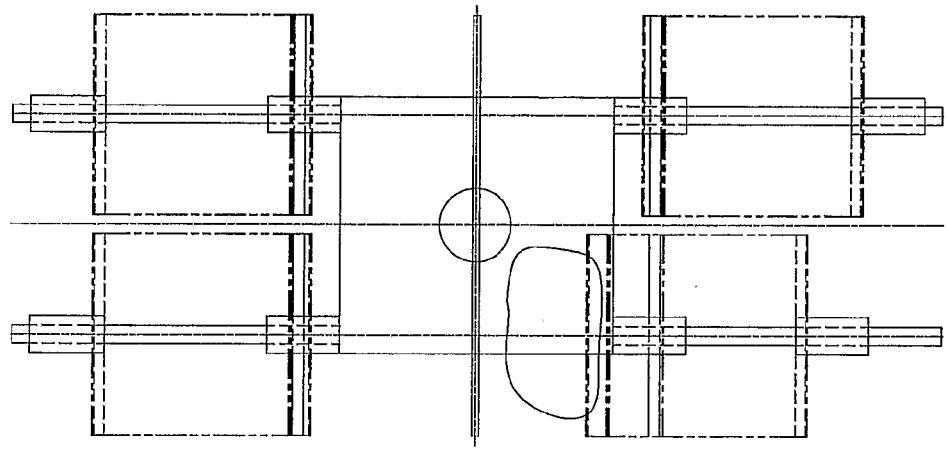
Figure 33:
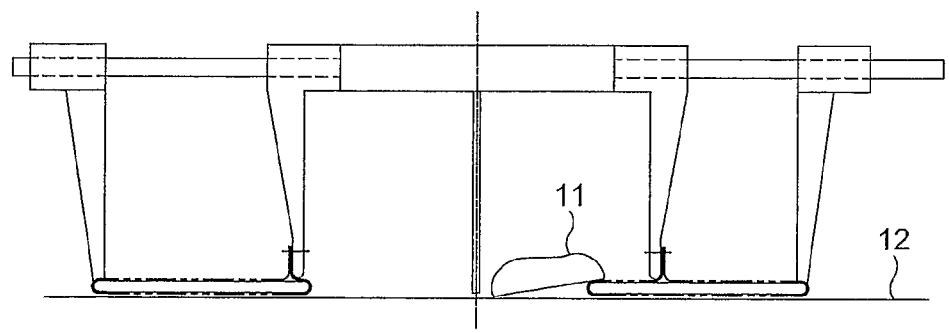

FIGS. 32 and 33 are plan and side views of the assembly with the blades starting to move under the product piece.

Figure 34:
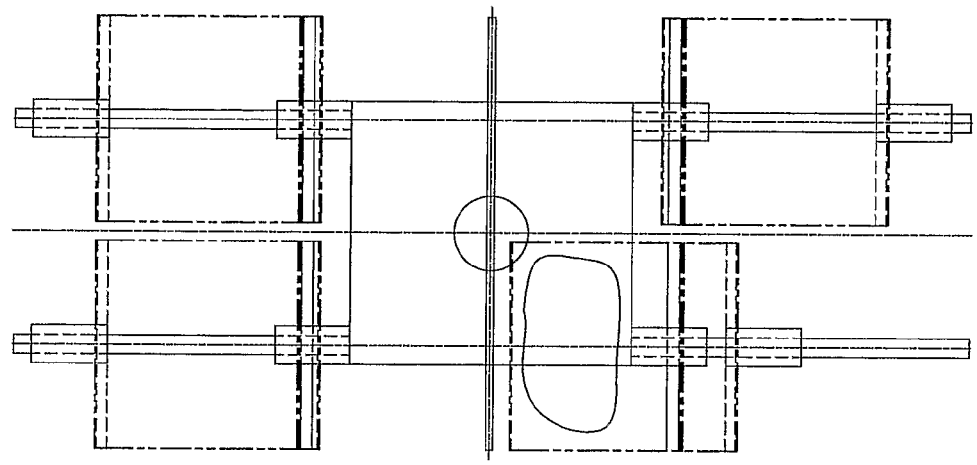
Figure 35:
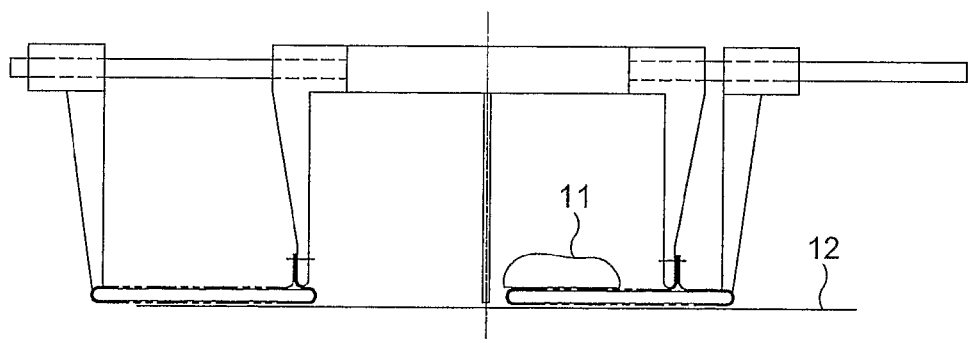

FIGS. 34 and 35 are plan and side views of the assembly with the blade fully under the product piece.

Figure 36:
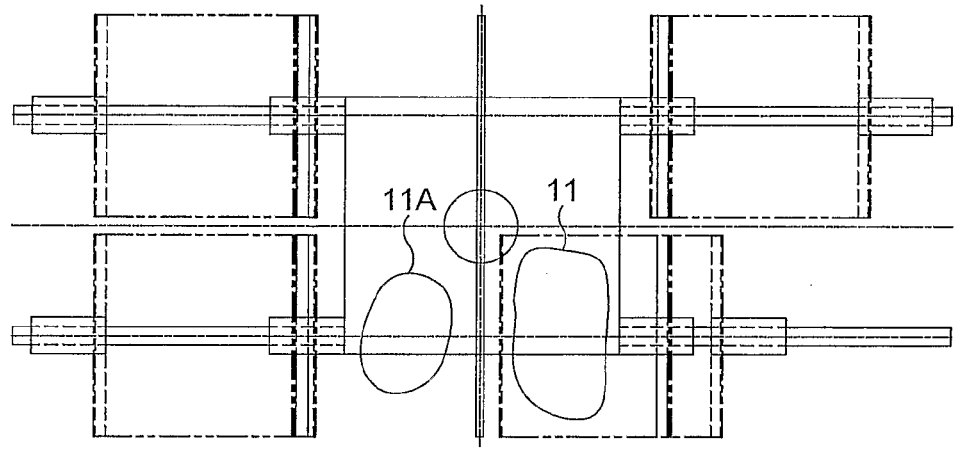
Figure 37:
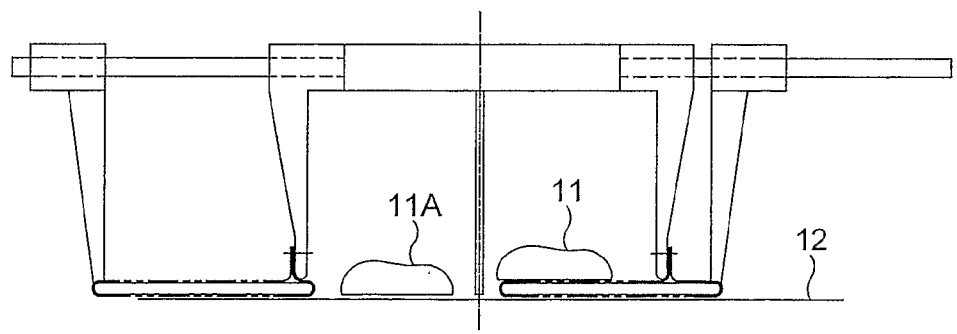

FIGS. 36 and 37 are plan and side views of the assembly with a second product piece 11A about to be picked (bottom left) from a conveyor 12.

Figure 38:
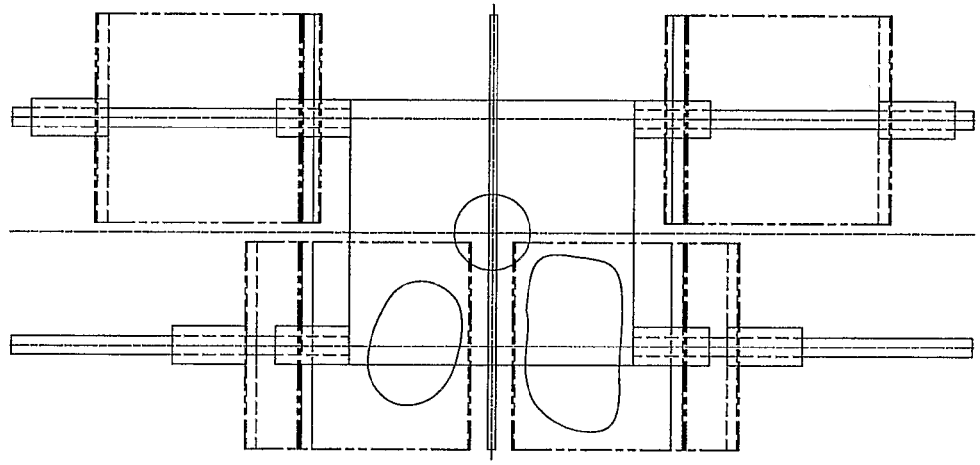
Figure 39:
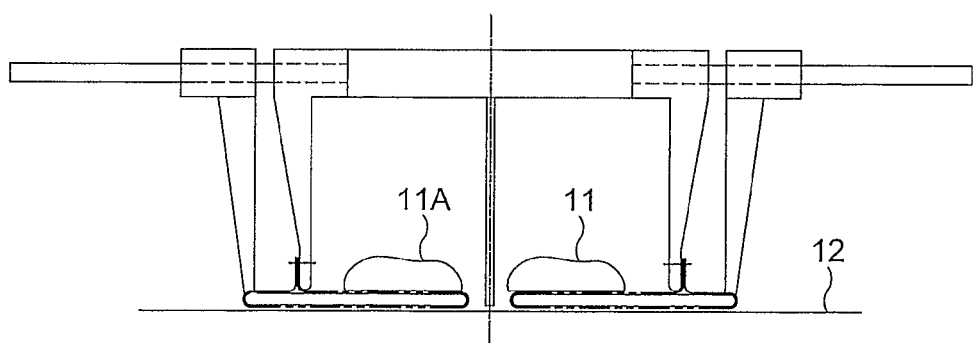

FIGS. 38 and 39 are plan and side views of the assembly with a blade fully under the second product piece.

Figure 40:
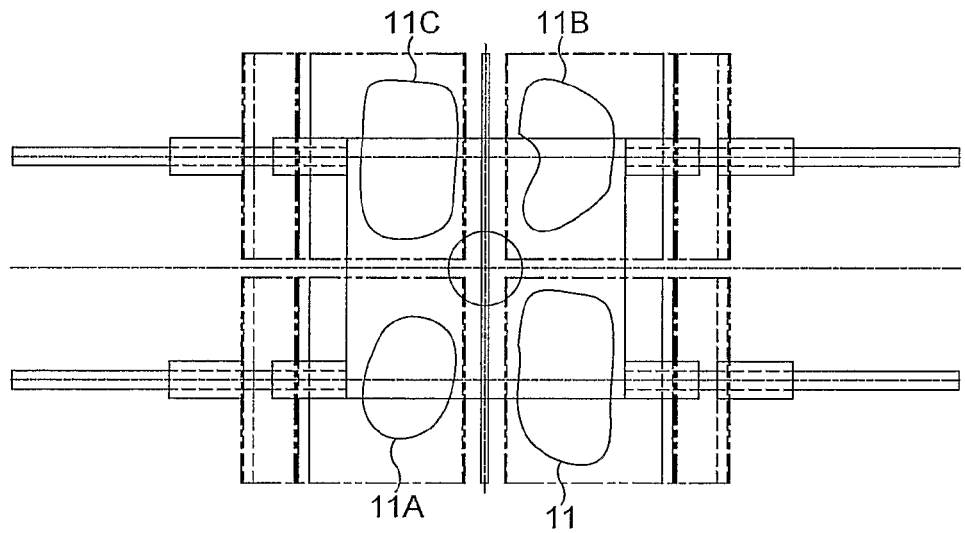
Figure 41:
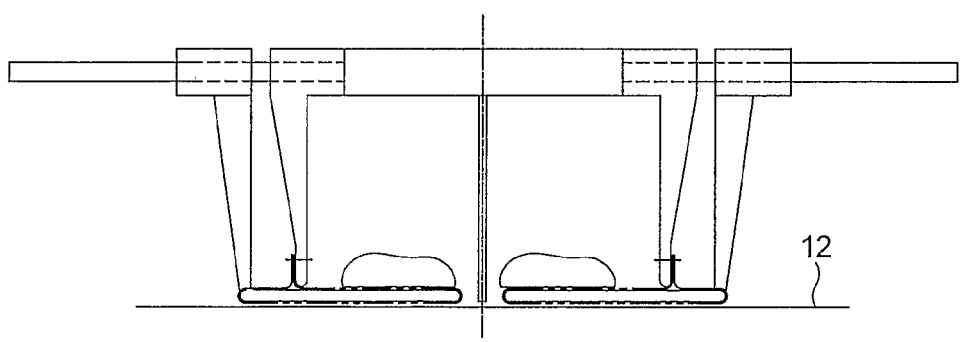

FIGS. 40 and 41 are plan and side views of the assembly with blades fully below four product pieces (11, 11A, 11B, 11C) on a conveyor 12.

Figure 42:
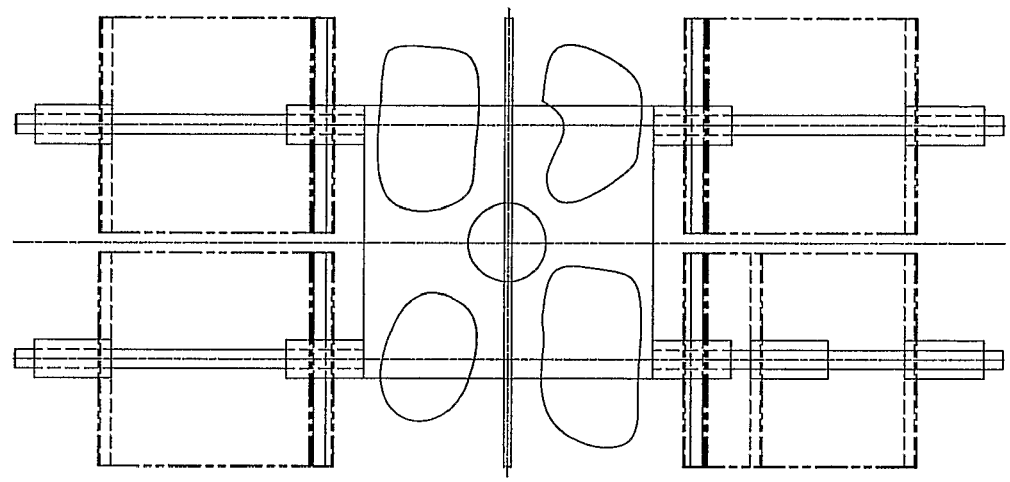
Figure 43:
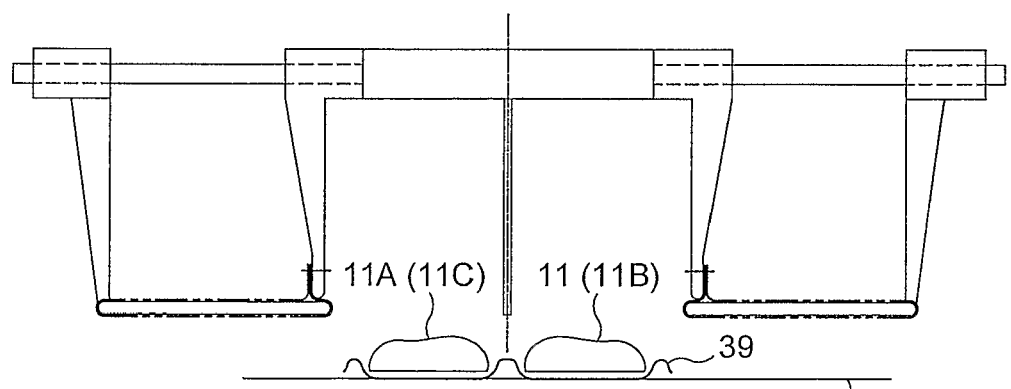
Figure 44:
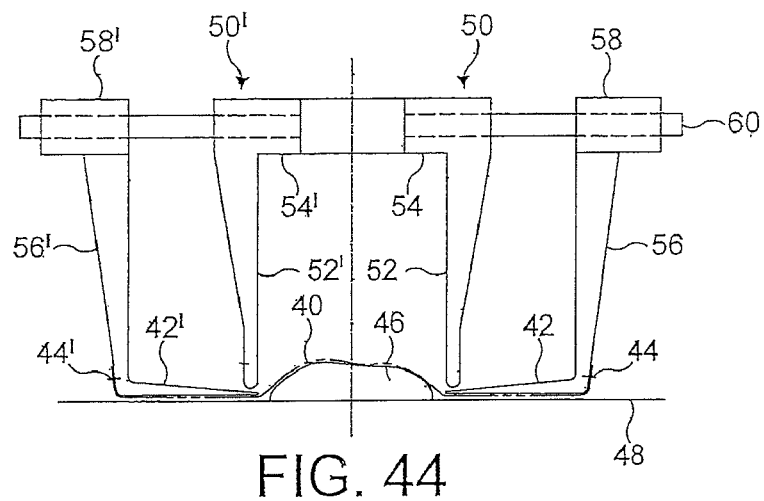

FIGS. 42 and 43 are plan and side views of the assembly with all four product pieces (11, 11A, 11B, 11C) simultaneously placed to in a container 39, on a conveyor 12A.

FIGS. 44-50 illustrate an alternative mirrored gripper assembly where the objective is to pick up a product and squeeze it to a reduced size to enable it to be placed in a small gap in a preformed package. This is a common procedure when packing a product manually.

Figure 45:
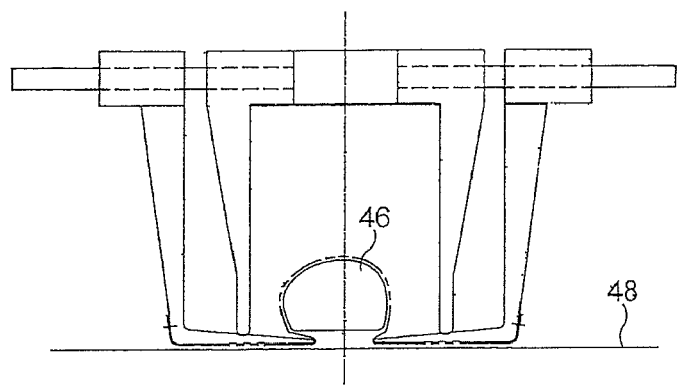

A flexible belt 40 is connected to the rear ends of blades 42, 42' at 44, 44' in such a way that in the gripper-open position the belt is slack. When an article 46 is to be picked from the infeed conveyor 48 the assembly is lowered over the article so that the belt 40 lies across the top of the article 46 and when the blades close, the belt is driven underneath the article by the blades so as to almost completely enwrap it, as shown in FIG. 45.

Figure 46:
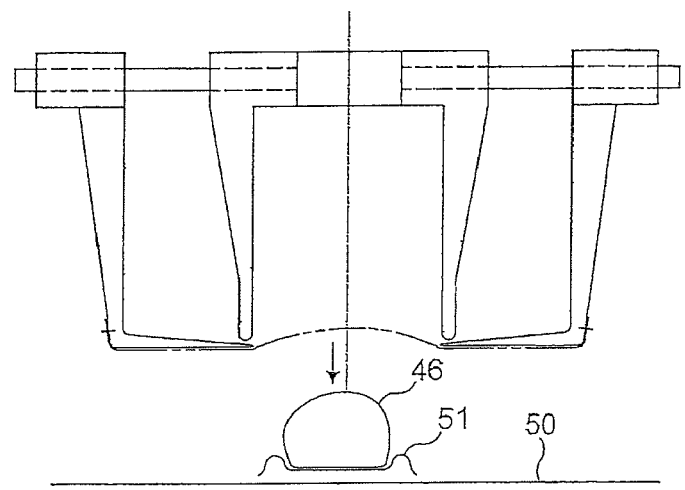
Figure 47:
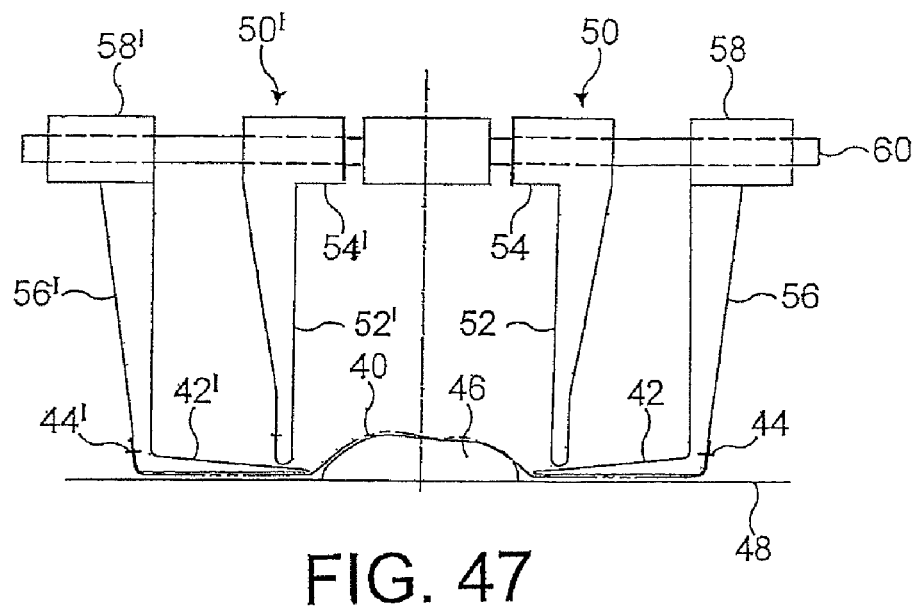
Figure 48:
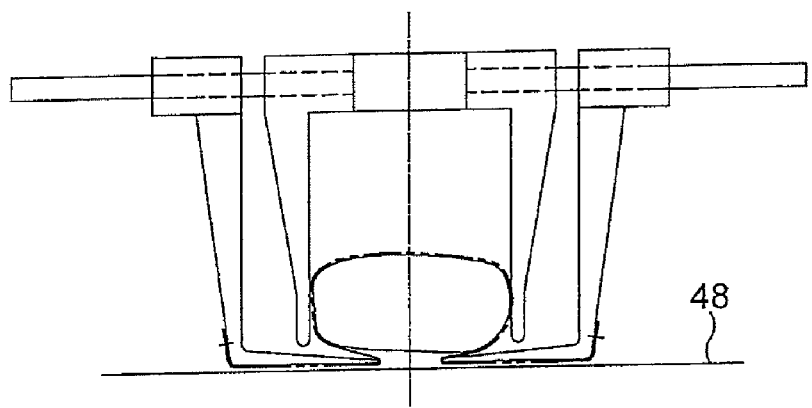
Figure 49:
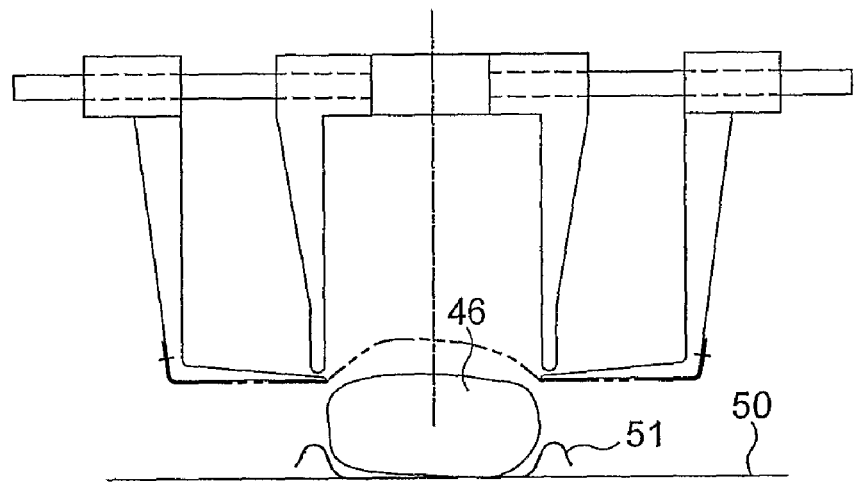
Figure 50:
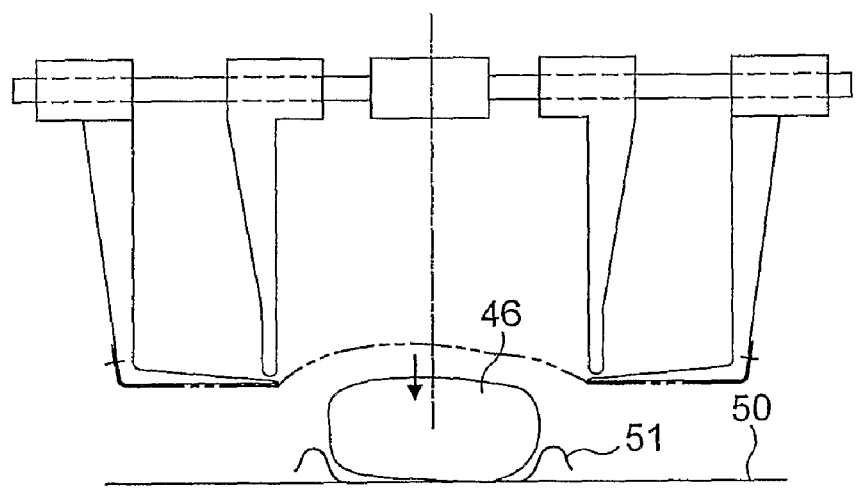
Figure 51:
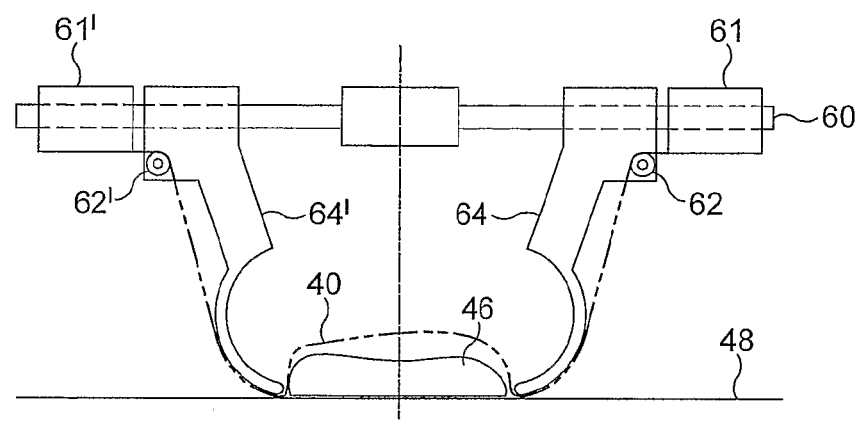

After moving the article to a new location such as on another conveyor 50, as shown in FIG. 46, opening the blades 42, 42' straightens the belt 40, which assists in releasing the article 46 from the gripper.

The advantage of the enwrapping is that the article 46 can thereby be squeezed and reduced thereby to a controlled shape/size before being placed on the conveyor 50 and if the latter has a container on it (see 51 in FIGS. 46, 49 and 50), to receive the article, the latter can be retained in its compressed state until it is deposited into a compartment in the container 51.

The fixtures 50, 50' can be fixed (as in FIGS. 44-46) or movable as in FIGS. 47-50.

Moving fixtures give additional options in regard to reducing the size of the article before it is placed in a container compartment, since as it can remain in the "squeezed" position between the arms 52, 52' which depend from blocks 54, 54' while the blades retract and open, so that as the belt is straightened the product is ejected downwardly in its "squeezed" state, between the arms 52, 52' into the compartment in the waiting container 51.

The blades 42, 42' are carried at the bottom of arms 56, 56' which depend from blocks 58, 58'. These are slidable along rod 60 by an actuator (not shown).

FIGS. 51-55 illustrate a mirrored gripper assembly which can pick up a product and squeeze it to a reduced size in the same manner as described above in relation to FIGS. 44-50.

A flexible belt is connected to second parts 61, 61' after passing over rollers 62, 62' located on respective first parts 64, 64'. This relative movement of the first parts 64, 64' and their respective second parts 61, 61' determines the length of belt between the end portions of the first parts.

A typical operation is shown sequentially in FIGS. 51-55.

Initially first parts 64, 64' and second parts 61, 61' are positioned away from the centre with the belt 40 in a slack state. An article has been fed to the centre by the infeed conveyor 48. The assembly is shown having already been lowered over the article to that the belt 40 lies across the top of the article 46.

Figure 52:
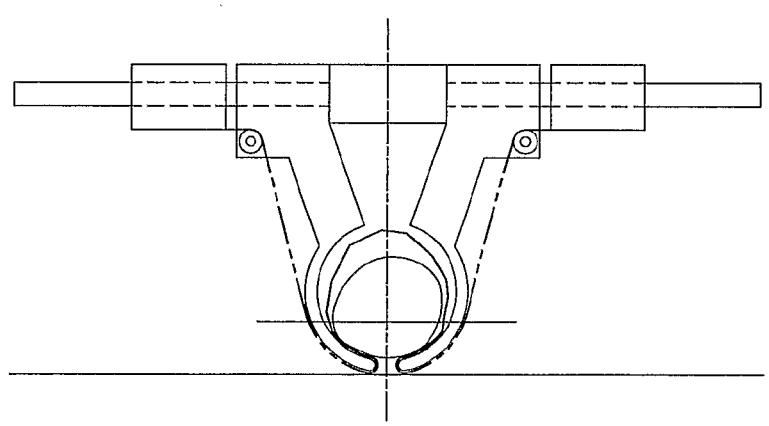

The first parts 64, 64' and second parts 61, 61' then move towards the centre, with first and respective second parts maintaining the same relative distance between them. The leading edge of the blade of the first parts moves parallel the surface and moves under the article 46. As just enough extra belt is fed as the parts move closer, there is no relative movement between belt and article. In FIG. 52 the article can be seen in this gripped state.

Figure 53:
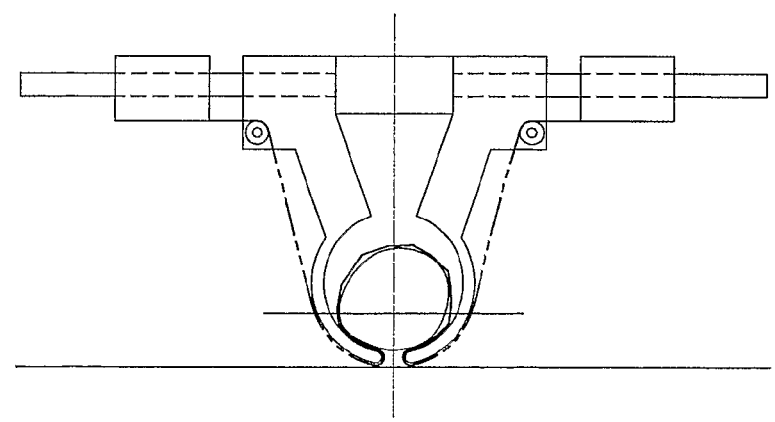

The article 46 is the squeezed by outward movement of second parts 61, 61' to a state shown in FIG. 53.

The whole assembly then lifts up, raising the squeezed article 46 away from the conveyor belt. This is then typically followed by laterally moving the assembly until the article 46 is above the location it is to be deposited.

Figure 54:
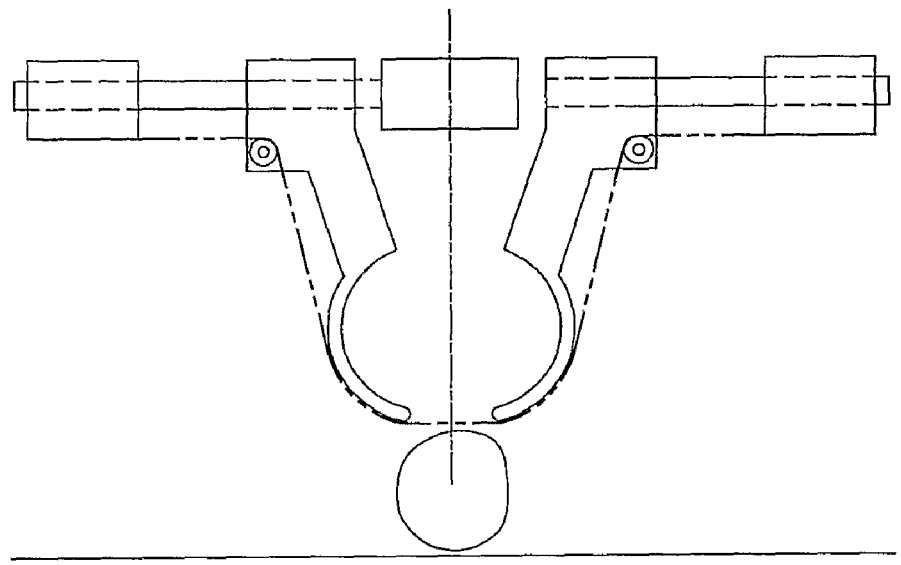

To deposit the article 46 the first parts 64, 64' and second parts 61, 61' move away from the centre until a gap is produced to allow the article to fall away onto the target location below. To assist the deposition of the article, second parts 61, 61' continue to move away from the centre, having the effect of tightening the belt and pushing the article downwards, as shown in FIG. 54.

Figure 55:
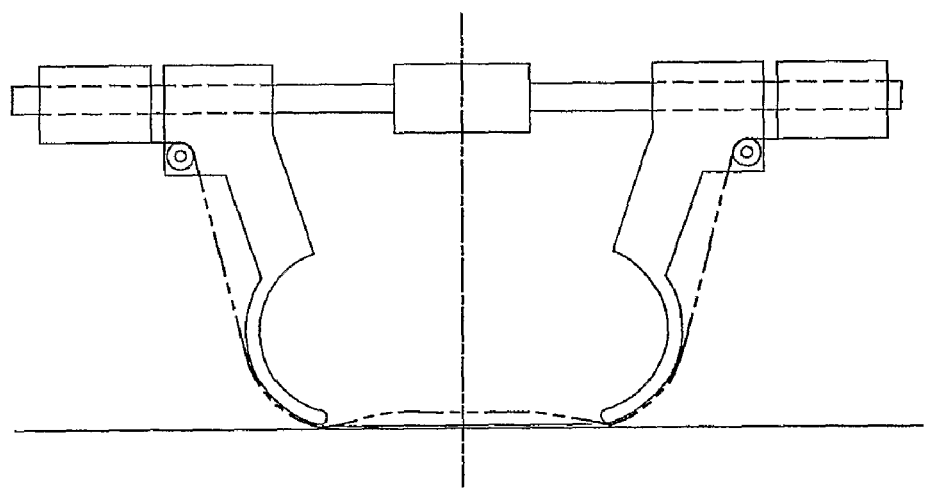

The first parts 64, 64' then also move further outwards to increase the gap between them, taking the assembly back to its initial state, as shown in FIG. 55, ready to receive a further article 46.

In all the arrangements illustrated the belt or belts can, if desired, be made from an elastic material to better deal with varying article size.

The invention claimed is:

1. A pick and place device for picking up and re-positioning an article carried by a support surface, comprising:
   1) a first part which includes a plate portion which is movable parallel to the support surface so that a leading edge thereof penetrates below the article, between the article and the support surface, and
   2) a belt of flexible material which is wrapped around at least the leading edge of the plate portion so that it is sandwiched between the plate and the article when the former penetrates therebelow and as the plate portion moves below the article, there is relative sliding movement between the belt and the plate portion wherever the belt is in contact with the plate portion and substantially no relative sliding movement between the sandwiched portion of the belt and the article.

2. A device as claimed in claim 1 which additionally comprises a second part which in use is situated to one side of the support surface, and defines a gap between its underside and the support surface or a plane containing the support surface.

3. A device as claimed in claim 1 wherein the belt is in tension around the plate portion, and remains so irrespective of the position of the plate portion relative to the article, so that as the plate portion is withdrawn from below the article, there is again no relative sliding movement between the belt and the article, only between the belt and the plate portion.

4. A device as claimed in claim 3 which includes means for tensioning the belt.

5. A device as claimed in claim 1 wherein a stop is provided, in use the plate portion is moved towards the stop when an article which is to be lifted up from the support surface is located between the plate portion and the stop,
   and wherein an article will be pushed against the stop due to friction forces between the article and the belt as the plate portion penetrates therebelow whereby in use the said penetration is prevented from pushing the article sideways across the support surface.

6. A device as claimed in claim 1 wherein a second first part is provided, in use the plate portion is moved towards the second first part when an article which is to be lifted up from the support surface is located between the plate portion and the second first part,
   and wherein the second first part is similar to the first part also having a flexible belt wrapped around the plate portion thereof, and the second first part is positioned relative to the first part so that in use the two plate portions move in the same plane but always in opposite directions, towards each other to penetrate below an article, and away from each other to disengage therefrom.

7. A device as claimed in claim 1 wherein a part of the belt is secured at a point separate from the plate portion.

8. A device as claimed in claim 7 wherein the or each belt is stretched around its plate portion and has two ends secured to fixed points so that as the plate portion is moved relative thereto through the gap, the belt is also drawn therethrough sliding around the plate portion which remains encircled by the belt wherever it moves.

9. A device as claimed in claim 8 wherein the two fixed points coincide to comprise a single fixed point.

10. A device as claimed in claim 8 wherein the two fixed points comprise two points on a single member which is stationary relative to the plate portion close to the lower edge thereof.

11. A device as claimed in claim 7, which additionally comprises a second part which in use is situated to one side of the support surface, and defines a gap between its underside and the support surface or a plane containing the support surface, and wherein the or each fixed point is on the second part.

12. A device claimed in claim 11 wherein the or each fixed point is close to the lower edge of the second part.

13. A device as claimed in claim 1 wherein the plate portion constitutes a thin flat plate.

14. A device as claimed in claim 1 wherein the plate portion constitutes a thin curved plate.

15. A device as claimed in any of claims 1 to 7 wherein one end of the or each belt is secured to one end of a resiliently extensible device, the other end of the or each belt is secured to a first fixed point, and the other end of the resiliently extensible device is secured to a second fixed point, so that as the plate portion around which the belt passes is moved forwards in use to penetrate below an article, the device extends to permit the belt to follow the plate portion and as the latter moves rearwardly to disengage from an article, and the resilience of the device keeps the belt tightly wrapped around the plate portion whilst shrinking to accommodate the reversing movement which would otherwise cause the belt to become slack.

16. A device as claimed in claim 15 wherein the resiliently extensible device comprises a helical spring.

17. A device as claimed in claim 15, which additionally comprises a second part which in use is situated to one side of the support surface, and defines a gap between its underside and the support surface or a plane containing the support surface, and wherein the first fixed point is on the second part and the second fixed point is on the first part of which the plate portion forms a part, so that in use it moves in the same way as does the plate portion, thereby reducing the extent by which the resilient device would otherwise have to extend to accommodate the movement of the belt around the plate portion as the latter moves forward.

18. A device as claimed in claim 1 wherein the support surface comprises the upper surface of a conveyor.

19. A device as claimed in claim 1 wherein two first parts are provided one on each side of an article support surface the two parts being movable as a unit up and down relative to the surface and the belt extends below the plate portions of the two first parts to protrude from below the leading edge of each plate portion and extend from one plate portion to the other, whereby in use the device is lowered over an article on the support surface so that the belt overlies and partially enwraps the article, and thereafter the plate portions are moved towards one another so as to more completely enwrap the article as the plate portions penetrate therebelow.

20. A device as claimed in claim 19 wherein in use reverse movement of the plate portions unwraps the belt from below an article so that after the plate portions have been retracted the belt will once again merely overlie and only partially enwrap the article so that the latter is free to be released therefrom.

21. A device as claimed in claim 20 wherein the article is released by dropping under gravity.

22. A device as claimed in claim 20 wherein the article is released by being moved transversely from between the two first parts.

23. A device as claimed in claim 22 wherein the article is moved transversely by a conveyor or other mechanical handling device.

24. A device as claimed in claim 20 wherein the article is released by lifting the two first parts upwardly relative to a support surface on which the article has been placed to leave the article thereon.

25. A method of picking up and re-positioning an article carried by a support surface using a device comprising a first part which includes a plate portion, and a belt of flexible material which is wrapped around at least the leading edge of the plate portion, the method comprising a step of moving the plate portion parallel to the support surface so that a leading edge thereof penetrates below the article, between the article and support surface, so as to sandwich a portion of the belt between the article and the plate portion, and as the plate portion moves below the article, there is relative sliding movement between the belt and the plate portion wherever the belt is in contact with the plate portion and substantially no relative sliding movement between the sandwiched portion of the belt and the article.

* * * * *